United States Patent
Ai (10) Patent No.: US 6,406,399 B1
(45) Date of Patent: Jun. 18, 2002

(54) PLANETARY TRACTION DRIVE TRANSMISSION

(75) Inventor: Xiaolan Ai, Massillon, OH (US)

(73) Assignee: The Timken Company, North Canton, OH (US)

( * ) Notice: Subject to any disclaimer, the term of this patent is extended or adjusted under 35 U.S.C. 154(b) by 0 days.

(21) Appl. No.: 09/627,675

(22) Filed: Jul. 28, 2000

(51) Int. Cl.$^7$ .......................... F16H 13/06; F16H 57/08
(52) U.S. Cl. .................... 475/183; 475/197; 475/336
(58) Field of Search ................................ 475/183, 197, 475/331, 334, 335, 336, 348, 184, 190, 193, 342

(56) References Cited

U.S. PATENT DOCUMENTS

| | | | |
|---|---|---|---|
| 1,003,055 A | | 9/1911 | Lockwood |
| 1,499,763 A | * | 7/1924 | Davis .......................... 74/803 |
| 2,089,048 A | | 8/1937 | Bachman |
| 3,224,300 A | | 12/1965 | Chery |
| 3,705,522 A | * | 12/1972 | Ogawa .......................... 74/803 |
| 5,021,035 A | * | 6/1991 | Zhou .......................... 475/183 |
| 5,025,671 A | | 6/1991 | Kraus |
| 5,385,514 A | * | 1/1995 | Dawe .......................... 475/336 |
| 5,957,804 A | * | 9/1999 | Shulz et al. ............. 475/342 X |
| 6,004,239 A | * | 12/1999 | Makino .................. 475/193 X |
| 6,095,940 A | | 8/2000 | Ai |

FOREIGN PATENT DOCUMENTS

| | | | | |
|---|---|---|---|---|
| EP | 0311306 | * | 4/1989 | ............... 475/336 |
| GB | 8337 | | 7/1897 | |
| JP | 10860 | | 1/1979 | |
| JP | 39763 | | 3/1979 | |
| JP | 2-76962 | * | 3/1990 | ............... 475/183 |
| JP | 2-180346 | * | 7/1990 | ............... 475/183 |
| JP | 5-157148 | * | 6/1993 | ............... 475/183 |
| JP | 6-307505 | * | 11/1994 | ............... 475/342 |

* cited by examiner

Primary Examiner—Charles A. Marmor
Assistant Examiner—Roger Pang
(74) Attorney, Agent, or Firm—Polster, Lieder Woodruff & Lucchesi, L.C.

(57) ABSTRACT

A planetary traction drive transmission has a sun roller provided with two inner raceways which are presented outwardly and taper downwardly away from each other. It also has two outer rings located within a housing, with the rings surrounding the sun roller and having tapered raceways presented inwardly toward the tapered raceways of the sun roller. In addition the transmission has planet rollers which are organized in two rows, there being a separate row within each ring. The rollers have tapered side faces along which they contact the raceways of the sun roller and the rings. They are also organized in pairs, with a roller of each row forming a pair. The rollers of a pair contact each other at beveled end faces on the rollers, and thus each roller of the pair serves to back and axially position the other roller of the pair. At all lines of contact between the rollers and the raceways and between the rollers themselves pure rolling contact, characterized by the absence of spinning, exists. In one embodiment the raceways of the sun roller are locked together and relative rotation occurs between the outer rings. In another embodiment the outer rings are locked together and relative rotation occurs between the raceways of the sun roller. Each embodiment provides high speed and torque ratios in a very compact package.

23 Claims, 5 Drawing Sheets

PLANETARY TRACTION DRIVE TRANSMISSION

CROSS-REFERENCE TO RELATED APPLICATIONS

None.

STATEMENT REGARDING FEDERALLY SPONSORED RESEARCH OR DEVELOPMENT

Not applicable.

BACKGROUND OF THE INVENTION

This invention relates in general to transmissions and, more particularly, to a planetary traction drive transmission having, at critical surfaces, pure rolling contact which is characterized by the absence of spinning.

Planetary transmissions typically rely on meshing gears to transfer power—indeed, several planet gears between a sun gear and a ring gear. This arrangement distributes the load through the several planet gears, enabling the system to accommodate higher loads, and further provides several speed ratios, depending on where power is supplied to the system and where it is delivered from the system. But gear systems inherently contain backlash, are somewhat noisy, and set up vibrations. Moreover, the meshing gear teeth slide across each other, and the friction generated detracts from the efficiency of the system.

Planetary friction or traction drives, which rely solely on friction between rotating components to transfer power, do not have backlash and further operate with less noise and less vibration than planetary gear systems, and in that sense they are superior to planetary gear systems. Furthermore, they have the capacity to operate at high velocity and with high efficiency. Even so, many planetary systems of current design experience slipping in the form of spinning at critical surfaces where torque is transmitted, or to minimize this they may rely on narrow regions of contact where loads are heavily concentrated.

Actually, two types of slippage may exist along a line of contact between two critical surfaces in a traction drive transmission. One is characterized by pure sliding in which the difference in velocity between the two surfaces at the line of contact remains the same along the entire line of contact. Lubrication will accommodate this type of slippage, and indeed this type of slippage inherently exists when lubrication is present. Insofar as this discussion is concerned, this type of slippage constitutes pure rolling contact. The other type of slippage is characterized by spinning along the line of contact. Here the difference in velocity between the two critical surfaces varies along the line of contact. It may be in the same direction, in which case the pivot point is at or beyond the end of the line contact, or it may be in two directions, in which event the pivot point is between the ends of the line of contact.

Spinning wastes energy and produces heat that may diminish the effectiveness of lubricants in the transmission. It also promotes wear which affects the reliability of the transmission and likewise limits the torque transmitted by it. When narrow regions of contact are used to minimize slippage, the concentration of loads so produced may cause early failure of the metal in the regions where the loads are concentrated and further reduces the capacity of the transmission to transmit torque.

Moreover, traction drives of current design cannot achieve high speed ratios without being excessively large. Thus, they are not suited for use in confined spaces when high speed ratios and equivalent torque ratios are required.

SUMMARY OF THE INVENTION

The present invention resides in a planetary traction drive transmission having a sun roller provided with first and second inner raceways that taper downwardly from each other. The transmission also has first and second outer raceways which are presented toward the first and second inner raceways, respectively, and likewise have their large ends presented toward each other. First and second planet rollers are located between the first and second raceways, respectively, where they are organized in pairs, with each pair including a first roller and a second roller. Moreover, the rollers of each pair back each other and thus axially position each other between the raceways. Either the inner raceways or the outer raceways may be locked against rotation relative to each other.

DETAILED DESCRIPTION

Referring now to the drawings, a planetary traction drive transmission I (FIG. 1) operates with essentially no spinning along contacting surfaces at which power is transferred through the transmission. When configured properly, the transmission I will transfer power at high speed ratios and at correspondingly high torque ratios. The transmission I, which is organized about a center or main axis X, basically includes a sun roller 2, a pair of outer rings 4 and 6 located around the sun roller 2, yet spaced from the roller 2, and planetary rollers 8 and 10 occupying the annular spaces between the sun roller 2, on one hand, and the outer rings 4 and 6 on the other. Actually, the rollers 8 are organized in one circular row that is within the outer ring 4, and the rollers 10 are organized in another circular row that is within the outer ring 6. Moreover, the rollers 8 and 10 are arranged in pairs, there being for each roller 8 a corresponding roller 10 that is generally aligned with it. In addition, the transmission I has a planet carrier 12 coupled to the planetary rollers 8 and 10 and serving to maintain the rollers 8 and 10 of each pair aligned. Also, the transmission I has a housing 14 which encloses the outer rings 4 and 6 as well as the rollers 8 and 10 and the sun roller 2 and also the planet carrier 12. Finally, the transmission I has an end disk 16 which is coupled to the outer ring 6.

The sun roller 2 is mounted on a center shaft 20 (FIG. 1), the axis of which coincides with the axis X. It has two tapered raceways 22 and 24, the former of which is inclined at an angle $\alpha_1$ (FIG. 2), with respect to the axis X and the latter at an angle $\alpha_2$. The envelopes formed by the two raceways 22 and 24 are conical and intersect at a circle A, which for purposes of discussion should be considered a point A. The envelopes for the raceways 22 and 24 have their apices along the axis X at points S and T, respectively.

The outer ring 4 occupies one end of the housing 4 (FIG. 1) to which it is generally locked to the housing 14 in the sense that it does not undergo rotation or axial displacement of significance relative to the housing 14. The ring 4 has a tapered raceway 26 that is presented inwardly toward the raceway 22 on the sun roller 2, and that raceway lies within a conical envelope having its apex along the axis X at the point S. It assumes an angle $\beta_1$ (FIG. 2), with respect to the axis X. By reason of the tapered raceway 26, the ring 4 has a large end and a small end. Along its small end the ring 4 has a roller ramp 28.

Figure 1:
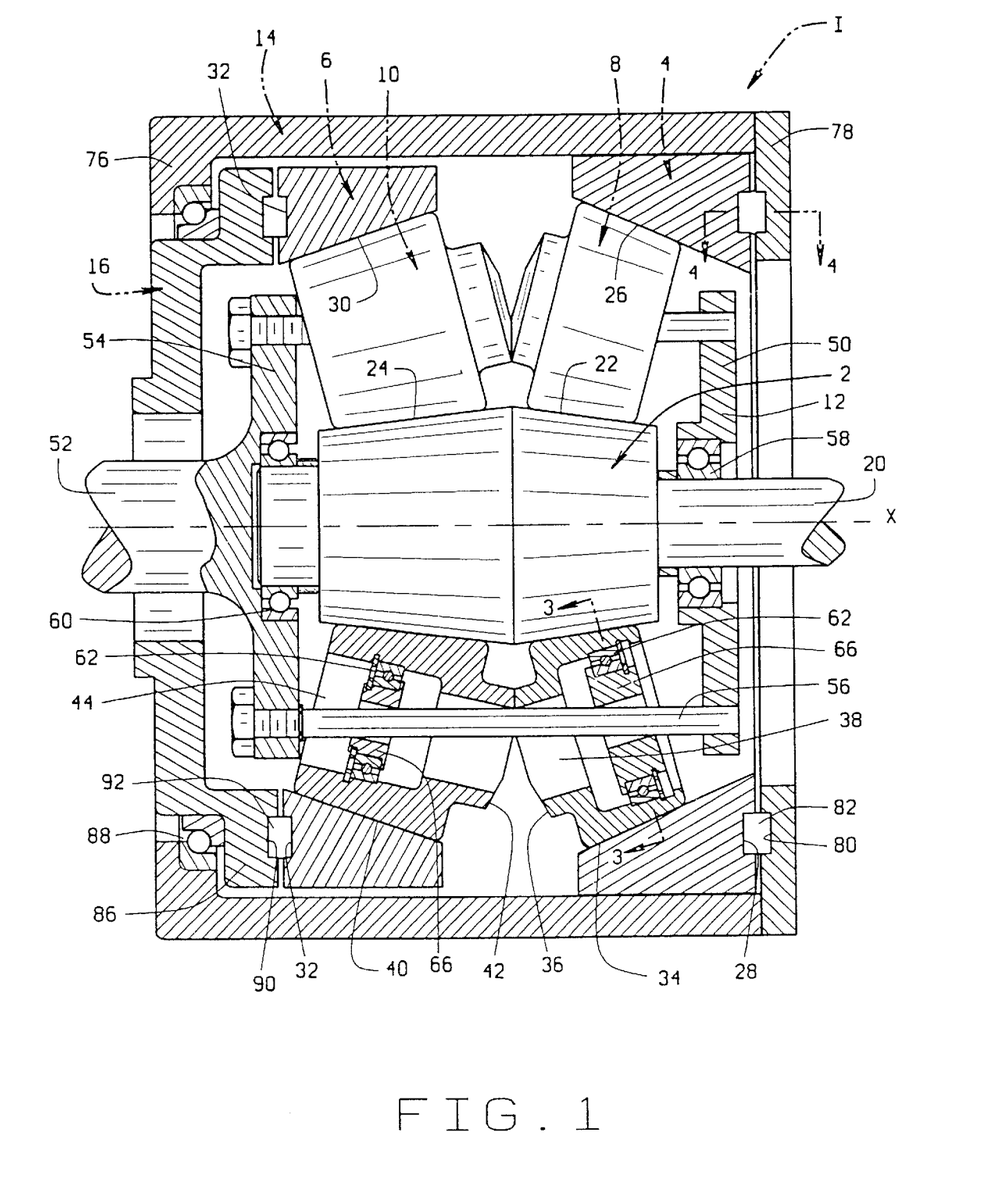
FIG. 1 is a longitudinal section view of a transmission constructed in accordance with and embodying the present invention.
Figure 2:
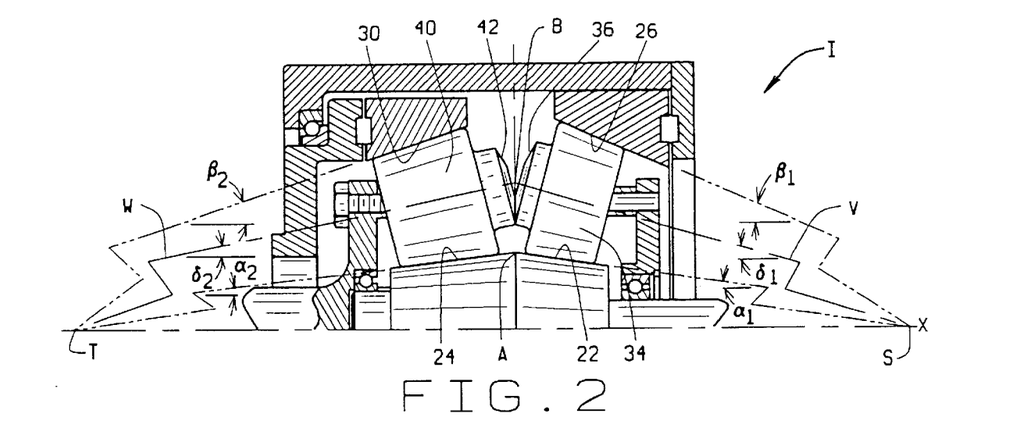
FIG. 2 is a half-sectional view of the transmission schematically showing the envelopes in which the raceways lie.

In contrast to the outer ring 4, the outer ring 6 fits loosely into the housing 14 so that it can rotate relative to the housing 14. It occupies the other end of the housing 14 and has a tapered inner raceway 30 that is presented inwardly toward the inner raceway 24 on the sun roller 2. The raceway 30 lies within a conical envelope having its apex along the axis X at the point T (FIG. 2). It assumes an angle $\beta_2$ with respect to the axis X. The taper of the raceway 30 imparts a large end and a small end to the ring 6, and at its small end the ring 6 has a roller ramp 32.

The planetary rollers 8 occupy the annular space between the raceway 22 on the sun roller 2 and the raceway 26 on the outer ring 4 (FIG. 1). Each roller 8 has a tapered side face 34 along which the roller 8 contacts thee raceway 22 of the sun roller 2 and the raceway 26 of the outer ring 4, there being essentially line contacts between the side face 34 and the raceways 22 and 26. Thus, the side face 34 lies in a conical envelope having its apex at the point S (FIG. 2). Each roller 8 revolves about its own axis V which intersects the main axis X at an angle $\delta_1$, which mathematically is defined as:

$$\delta_1 = \tfrac{1}{2}(\alpha_1 + \beta_1).$$

In addition to its side face 34, each planetary roller 4 has a beveled end face 36 which is presented toward its corresponding roller 10 in the other row. Finally, each roller 8 contains an internal cavity 38 that passes completely through the roller 4, opening out of each of its ends.

The planetary rollers 10 occupy the annular space between the raceway 24 on the sun roller 2 and the raceway 30 on the outer ring 6 (FIG. 1). Each roller 10 has a side face 40 at which it contacts the raceways 24 and 30, there being essentially line contacts between the side face 40 and the raceways 24 and 30. Thus, the side face 40 lies within a conical envelope having its apex at the point T (FIG. 2) along the main axis X. The centerline of that envelope constitutes the axis W of rotation for that roller 10, and the angle $\delta_2$ between the axes W and X may be expressed mathematically:

$$\delta_2 = \tfrac{1}{2}(\alpha_2 + \beta_2)$$

Within each pair of rollers 8 and 10 the axes V and W of those rollers 8 and 10 intersect at a point B. Beyond the large end of the tapered side face 40 for each roller 10, the roller 10 has a beveled end face 42. The rollers 8 and 10 of any pair contact each other along their respective beveled end faces 36 and 42. Actually, straight line contact exists between the rollers 8 and 10 of a pair at their end faces 36 and 42, and the line of contact passes through the points A and B. Each roller 10 also has a cavity 44 which extends completely through it, opening out of both of its ends.

By reason of the taper of the raceways 22 and 26, the rollers 8 seek to move up those raceways 22 and 26. The same holds true for the rollers 10. They seek to move up the raceways 24 and 30. However, for each roller 8 between the raceways 22 and 26 there exists a corresponding roller 10 between the raceways 24 and 30. Thus, the rollers 10 maintain the axial position of the rollers 8 between the raceways 22 and 26, and the rollers 8 maintain the axial position of the rollers 10 between the raceways 24 and 30. Within any pair, the roller 10 backs the roller 8 and vice versa.

The planet carrier 12 includes (FIG. 1) a carrier disk 50 located beyond the planet rollers 8. It also includes shaft 52 aligned with the center shaft 20 and provided with another carrier disk in the form of a flange 54 that lies beyond the planet rollers 10. Finally, the carrier 12 has rods 56 which extend between the carrier disk 50 and the flange 54 on the end shaft 52. The end disk 50 fits around the center shaft 20 with rotation between the two being accommodated by a ball bearing 58. The end shaft 52 at its flange 54 is fitted to the end of the center shaft 20 with another ball bearing 60. The bearings 58 and 60 prevent radial displacement of the carrier 12, yet enable it to rotate about the axis X.

Figure 3:
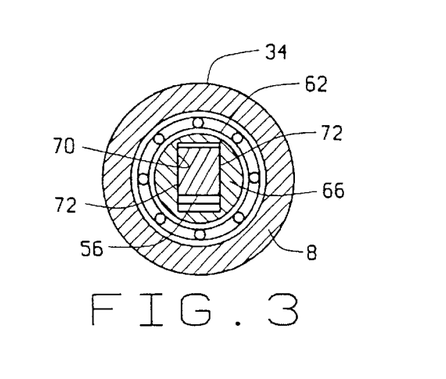
FIG. 3 is a sectional view taken along line 3—3 of FIG. 1.

The tie rods 56 pass through the cavities 38 in the planet rollers 8 and the cavities 44 in the planet rollers 10 (FIG. 1), there being a separate tie rod 56 for each pair of rollers 8 and 10. Actually each roller 8 and 10 contains a ball bearing 62 that is fitted around a bushing 66 which in turn is fitted over the tie rod 56. The bushing 66 contains a rectangular opening 70 (FIG. 3). Each tie rod 56 in the region of the two bushings 66 and bearings 62 that fit around it has lands 72 which fit within the rectangular opening 70 for the bushings 66 so that the rollers 8 and 10 are confined laterally, that is, circumferentially with respect to the axis X. But in this region the tie rods 56 are somewhat shorter than the openings 70, so that the tie rods 56 do not restrict radial movement of the rollers 8 and 10.

Figure 4:
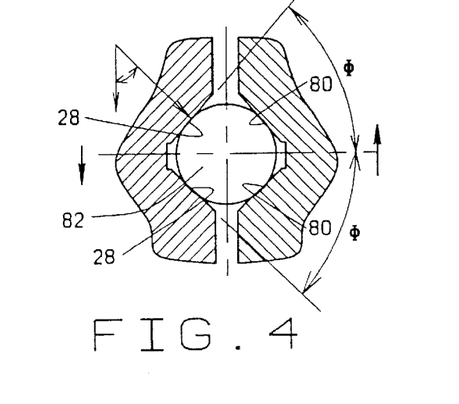
FIG. 4 is a fragmentary sectional view taken along line 4—4 of FIG. 1.

The housing 14 fits around the two outer rings 4 and 6 (FIG. 1) and around the end disk 16 as well. While all three are fitted loosely into the housing 14, the outer ring 6 and the end disk 16 are designed to rotate relative to the housing 14. At its one end the housing 14 has a rib 76 which turns inwardly and lies beyond the peripheral region of the end disk 16. At its opposite end the housing 14 has a removable rib 78 provided with roller ramps 80 which are located opposite the roller ramps 28 on the outer ring 4 (FIG. 4). The space between each pair of ramps 28 and 80 is occupied by a ramp roller 82. When the transmission I is at rest, the rollers 82 seek a neutral position at the bottoms of their respective ramps 28 and 80. But when the outer ring 4 rotates ever so slightly with respect to the housing 14, the rollers 82 ride up their ramps 28 and 80 and displace the outer ring 4 axially in the housing 14. This seats the planet rollers 8 more tightly between the raceways 22 and 26 of the sun roller 2 and outer ring 4, respectively. To seat the planet rollers 8 tightly enough between the sun roller 2 and the outer ring 4 to prevent excessive slippage between the roller side faces 34 and the raceways 22 and 26, the following relationship should exist:

$$\tan\phi \geq \frac{\sin\beta_1}{\mu}$$

where
- φ is one-half the angle between the ramps 28 on the outer ring and likewise one-half the angle between each the ramps 80 on the rib 78 of the housing 14.
- μ is the coefficient of friction at the contact between the side faces 34 of the rollers 8 and the raceways 22 and 26.

The end disk 16 remains free to rotate relative to the center shaft 20, and relative to the end shaft 52 and to the housing 14 (FIG. 1). But it essentially remains locked to the outer ring 6 and thus will rotate with the outer ring 6. The end disk 16 includes an offset 86 which is located between the outer ring 6 and the rib 76 on the end of the housing 14. Here the housing 14 and the end disk 16 are fitted with an angular contact ball bearing 88 which enables the disk 16 to rotate relative to the housing 14 and further transfers thrust loads from the disk 16 to the rib 76 of the housing 14. The offset 86 on the end disk 16 has ramps 90 which are presented toward the ramps 32 on the outer ring 6, and the spaces between the opposed ramps 32 and 90 are occupied by rollers 92. When the transmission I is at rest, the rollers 92 lie at the bottoms of their respective ramps 32 and 90, but when a slight rotational displacement occurs between the end disk 16 and the outer ring 6, the rollers 92 roll up the ramps 32 and 90 and urge the outer ring 6 toward the outer ring 4. This seats the planet rollers 10 more firmly against the raceways 24 and 30 along which the roll. To prevent excessive slippage between the side faces 40 on the rollers 10 and the raceways 24 and 30 on the sun roller 2 and outer ring 6, the following relationship should exist:

$$\tan\phi \geq \frac{\sin\beta_2}{\mu}$$

where
- φ is one-half the angle between the ramps 32 on the outer ring 6 and also one-half the angle between the ramps 90 on the end disk 16. μ is the coefficient of friction at the contact between the side faces 40 of the rollers 10 and the raceways 24 and 30.

Figure 5:
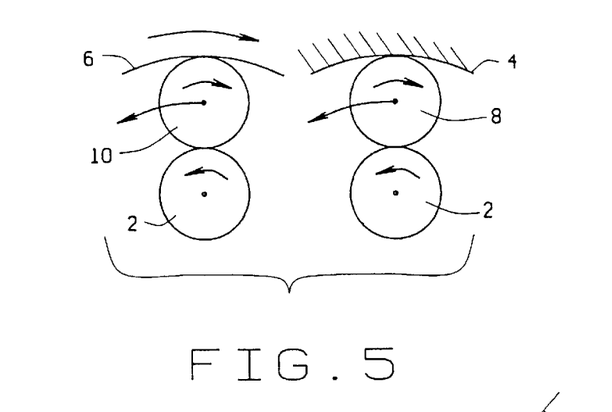
FIG. 5 is a schematic view illustrating the kinematics of the transmission.

The transmission I has the capacity to transfer torque and power in several ways. Torque may be applied to the transmission at the center shaft 20, at the end shaft 52 of the planet carrier 12, or at the end disk 16, or for that matter, even at the housing 14, and likewise torque may be delivered at any one of them, other than of course the one to which torque is applied. One of the remaining components should be held stationary or set to a prescribed rotation. In a typical application (FIG. 5), the housing 14 remains stationary, while torque is applied to center shaft 20 on which the sun roller 2 rotates, causing the planet rollers 8 to roll along the raceway 22 of the sun roller 2 and along the raceway 26 of the outer ring 4 which remains stationary within the housing 14. As a consequence, the planet rollers 8 revolve about the sun roller 2 and bring the carrier 12 along with it. The carrier 12 thus rotates about the axis X and turns the end shaft 52 from which torque is delivered. But the carrier 12 also carries the rollers 10 around the raceway 24 on the sun roller 2 and the rollers 10 revolve about their axes W as they orbit the sun roller 2. The orbiting and rotating rollers 10 drive the outer ring 6, causing it to rotate about the axis X as well, and the outer ring 6 drives the end disk 16 which is coupled to it. As the rollers 8 orbit the sun roller 2 they displace the outer ring 4 circumferentially in the housing 14, and this causes the ramp rollers 82 to move up the ramps 28 on the outer ring 4 and the ramps 80 on the rib 78 of the housing 14. As a consequence, the outer ring 4 moves axially slightly and the rollers 8 seat more firmly against the raceways 22 and 26 of the roller 2 and ring 4, respectively. By the same token, the rollers 10, as they orbit the sun roller 2, displace the outer ring 6 slightly with respect to the end disk 16. The rollers 92 move up the ramps 32 and 90 and urge the outer ring 6 toward the outer ring 4. The planet rollers 10 as a consequence seat more firmly against the raceways 24 and 30 of the sun roller 2 and ring 6, respectively. The speed ratio $K_{2-16}$ between the sun roller 2 and the end disk 16 may be calculated as follows:

$$K_{2-16} = \frac{\omega_2 - \omega_4}{\omega_6 - \omega_4} = \frac{k_1 - 1}{k_1/k_2 - 1}$$

where
$$k_1 = \frac{\sin\beta_1}{\sin\alpha_1}$$
$$k_2 = \frac{\sin\beta_2}{\sin\alpha_2}$$

- $\omega_2$ is the angular velocity of the center shaft 20 and sun roller 2
- $\omega_4$ is the angular velocity of the outer ring 4
- $\omega_6$ is the angular velocity of the outer ring 6

The speed ratio $K_{2-16}$ between the carrier 12 and its end shaft 52, on one hand, and the end disk 16 and outer ring 6 on the other is:

$$K_{12-16} = \frac{\omega_{12} - \omega_4}{\omega_6 - \omega_4} = \frac{1}{1 - \frac{k_1}{k_2}}$$

By keeping $k_1$ and $k_2$ close in magnitude, one can achieve high speed ratios. For example, when the housing 14 remains stationary and the angles within the transmission I have the following magnitude:

$\alpha_1$ and $\alpha_2$=3.0°
$\beta_1$=9.067°
$\beta_2$=9.033° the speed ratio $K_{12-16}$ between the carrier 12 and the end disk 16 equals −267.9:1, while the speed ratio $K_{2-16}$ between the sun roller 2 and the end disk 16 is 538.8:1.

In the operation of the transmission I pure rolling contact characterized by the absence of spinning occurs at all critical contact surfaces. In particular, pure rolling contact with no spinning occurs between:

a. the raceway 22 of the sun roller 2 and the side faces 34 of the planet rollers 8;

b. the raceway 26 of the outer ring 4 and the side faces 34 of the planet rollers 8.

c. the raceway 24 of the sun roller 2 and the side faces 40 of the planet rollers 10.

d. the raceway 30 of the outer ring 6 and the side faces 40 of the planet rollers 10.

e. the end face 36 of each planet roller 8 and the end face 42 of the corresponding planet roller 10.

A modified transmission II (FIGS. 6–8), which is likewise organized about a main or center axis X, includes two sun rollers 102 and 104, outer rings 106 and 108 which encircle the rollers 102 and 104, respectively, planet rollers 110 located between the sun roller 102 and outer ring 106, and more planet rollers 112 located between the sun roller 104 and the outer ring 108. Again, the planet rollers 110 and 112 are arranged in pairs, and within each pair, the roller 110 backs and axially positions the roller 112 and the roller 112 backs and axially positions the roller 110. In addition, the transmission II has a carrier 114 which rotates with the orbiting rollers 110 and 112 and a housing 116 which contains the outer ring 106 and 108. In a sense, the two sun rollers 102 and 104 may be considered a single sun roller in that they are on the same axis X.

The sun roller 102 occupies the end of a center shaft 120 to which it is fixed. It has a tapered raceway 122 located at an angle $\alpha_1$ (FIG. 7) with respect to the axis X. The other sun roller 104 occupies the end of another center shaft 124 to which it is fixed, and it has a tapered raceway 126 located at an angle $\alpha_2$ with respect to the axis X. The two rollers 102 and 104 are coupled at a ball bearing 128 which keeps them axially aligned, yet capable of rotating at different angular velocities. Thus, if the two sun rollers 102 and 104 are considered to be a single sun roller, as they may, the raceways 122 and 126 of that roller are capable of rotating relative to each other.

Figure 7:
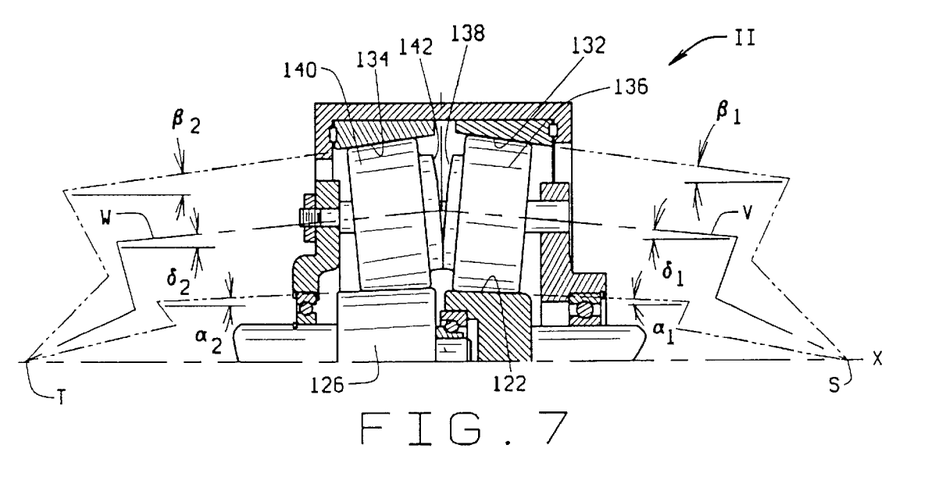
FIG. 7 is a half-sectional view of the transmission of FIG. 6 schematically showing the envelopes in which the raceways lie.
Figure 8:
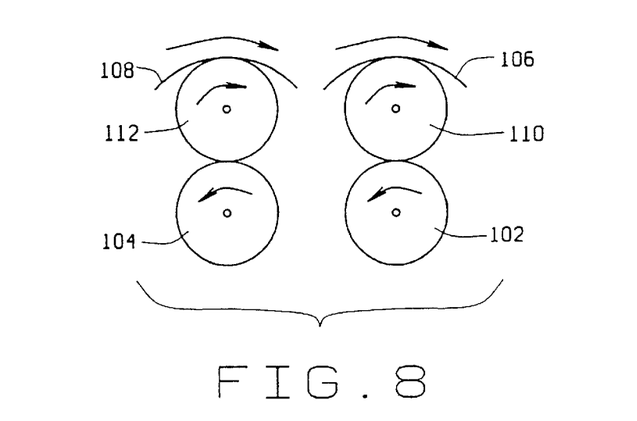
FIG. 8 is a schematic view illustrating the kinematics of the transmission of FIG. 6.

The outer rings 106 and 108 remain essentially fixed or locked in the housing 116, but have the capacity to shift circumferentially and axially a limited amount to render effective ramp-and-roller arrangements 130 at their ends. The formulas for the ramps 28 and 80 and the ramps 32 and 90 for the outer rings 4 and 6 of the transmission I apply to the ramps of the ramp-and-roller arrangements 130. The outer ring 106 has a raceway 132 located at an angle $\beta_1$ with respect to the axis X, whereas the outer ring 108 has a raceway 134 located at an angle $\beta_2$ with respect to the axis X.

The envelopes formed by the raceways 122 and 126 of the sun rollers 102 and 104 have their apices at points S and T, respectively, along the axis X (FIG. 7). By the same token, the envelopes formed by the raceways 132 and 134 of the outer rings 106 and 108 have their apices at the points S and T, respectively. Moreover, the envelopes of the raceways 132 and 134 of the outer rings 106 and 108 meet at a circle A, which for purposes of discussion is better considered a point A.

The rollers 110 orbit between the sun roller 102 and the surrounding outer ring 106, and in so doing each revolves about its own axis V. Each roller 110 has a tapered side face 136 along which it is in line contact with the raceways 122 of the roller 102 and the raceway 132 of the ring 106. Each roller 110 also has a beveled end face 138 that is presented toward its corresponding roller 112.

The planet rollers 112 orbit between the other sun roller 104 and the other outer ring 108, and in so doing revolve about their own axes of rotation W. The rollers 112 have tapered side faces 140 along which they contact the raceways 126 and 134 on the sun roller 104 and outer ring 108, respectively, there being line contact between the side faces 140 and raceways 126 and 134. In addition, the planet rollers 112 have beveled end faces 142 which bear against the beveled end faces 138 of the planet rollers 110. Within each pair of rollers 110 and 112 the axes V and W for those rollers intersect at a point B. Moreover the beveled end faces 138 and 142 contact each other along a straight line that passes through the points A and B.

Figure 6:
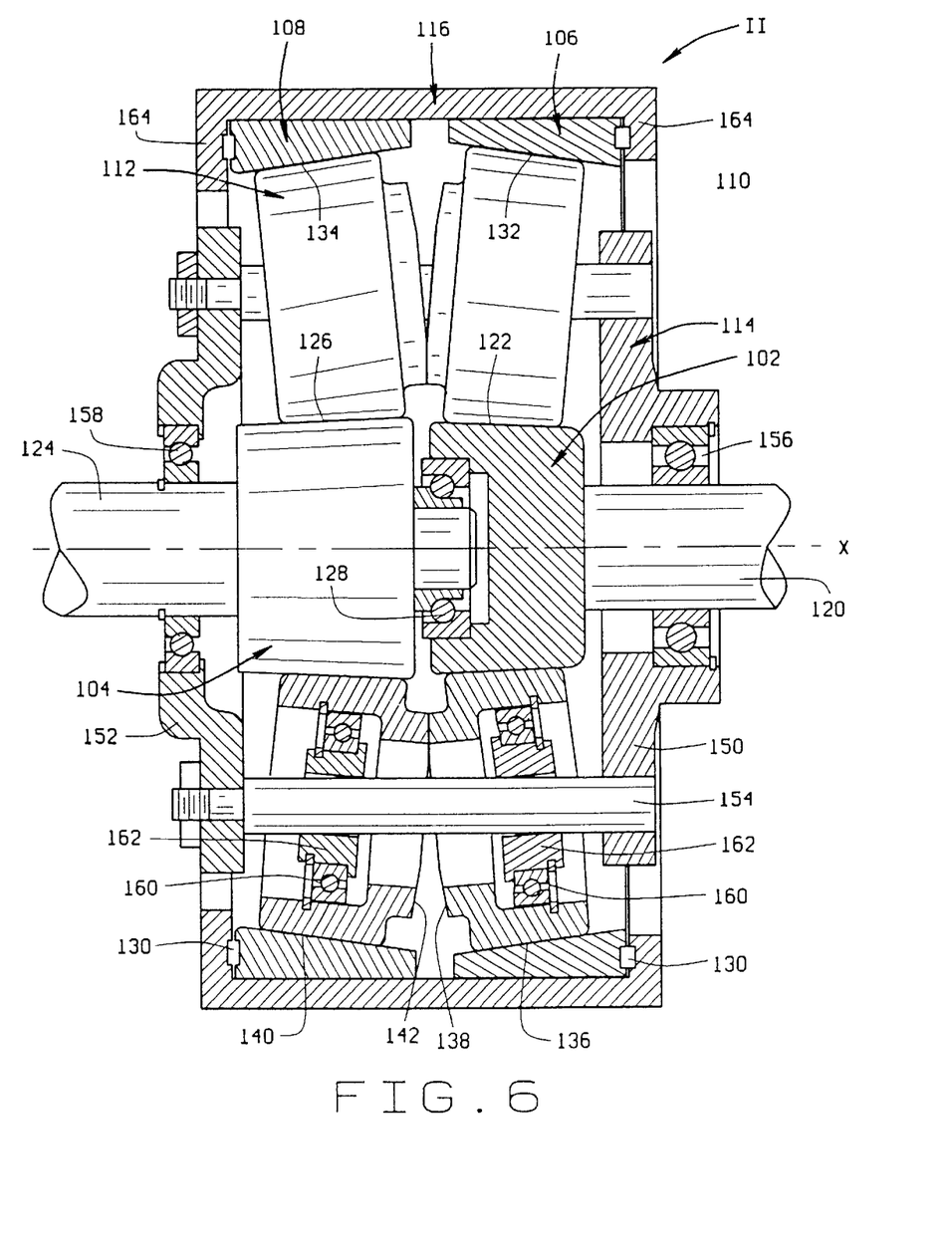
FIG. 6 is a longitudinal sectional view of another embodiment of the transmission.

The carrier 114 includes two carrier disks 150 and 152 and tie rods 154 extending between them. The carrier disk 150 rotates about the center shaft 120 on a bearing 156, whereas the carrier disk 152 rotates about the other center shaft 124 on another bearing 158. Each tie rod 154 extends through a pair of the planet rollers 110 and 112, there being a bearing 160 between each roller 110 and 112 and its tie rod 154. The bearings 160 fit over bushings 162 which fit on their respective tie rods 154 in a manner similar to the installation of the bearings 62 and bushings 66 on the tie rods 56 for the transmission I.

The housing 116 contains the two outer rings 106 and 108 which are afforded only a very limited range of circumferential and rotational movement relative to the housing 116 so as to be essentially locked to the housing 116. At its ends the housing 116 has ribs 164 which turn inwardly toward the two end disks of the carrier 114, to accommodate the ramp-and-roller arrangements 130.

When the center shaft 120 and its sun roller 102 are held stationary and torque is applied to the carrier 114 (FIG. 7), the housing 116 and the sun roller 104 and its center shaft 124 rotate, while the planet rollers 110 orbit between the sun roller 102 and outer ring 106 and the planet rollers 112 orbit between the sun roller 104 an the outer ring 108. The speed ratio $K_{114-104}$ between the carrier 114 and the sun roller 104 may be calculated as follows:

$$K_{114-104} = \frac{\omega_{114} - \omega_{102}}{\omega_{104} - \omega_{102}} = \frac{1}{1 - \frac{k_2}{k_1}}$$

If the torque is applied to the housing 116, the same components rotate and orbit. The speed ratio $K_{116-104}$ between the housing 116 and the sun roller 104 may be calculated as follows:

$$K_{116-104} = \frac{\omega_{116} - \omega_{102}}{\omega_{104} - \omega_{102}} = \frac{1 - 1/k_1}{1 - k_2/k_1}$$

where $$k_1 = \frac{\sin\beta_1}{\sin\alpha_1}$$

$$k_2 = \frac{\sin\beta_2}{\sin\alpha_2}$$

$\omega_{114}$ is the angular velocity of the carrier 114

$\omega_{116}$ is the angular velocity of the housing 116

$\omega_{102}$ is the angular velocity of the sun roller 102

$\omega_{104}$ is the angular velocity of the sun roller 104

In the operation of the transmission II pure rolling contact characterized by the absence of spinning occurs between:

a. the raceway 122 of the sun roller 102 and the side faces 136 of the planet rollers 110;

b. the raceway 132 of the outer ring 106 and the side faces 136 of the planet rollers 110;

c. the raceway 126 of the sun roller 104 and the side faces 140 of the planet rollers 112;

d. the raceway 134 of the outer ring 108 and the side faces 140 of the planet rollers 112;

e. the end faces 138 and 142 of the planet rollers 110 and 112.

Figure 9:
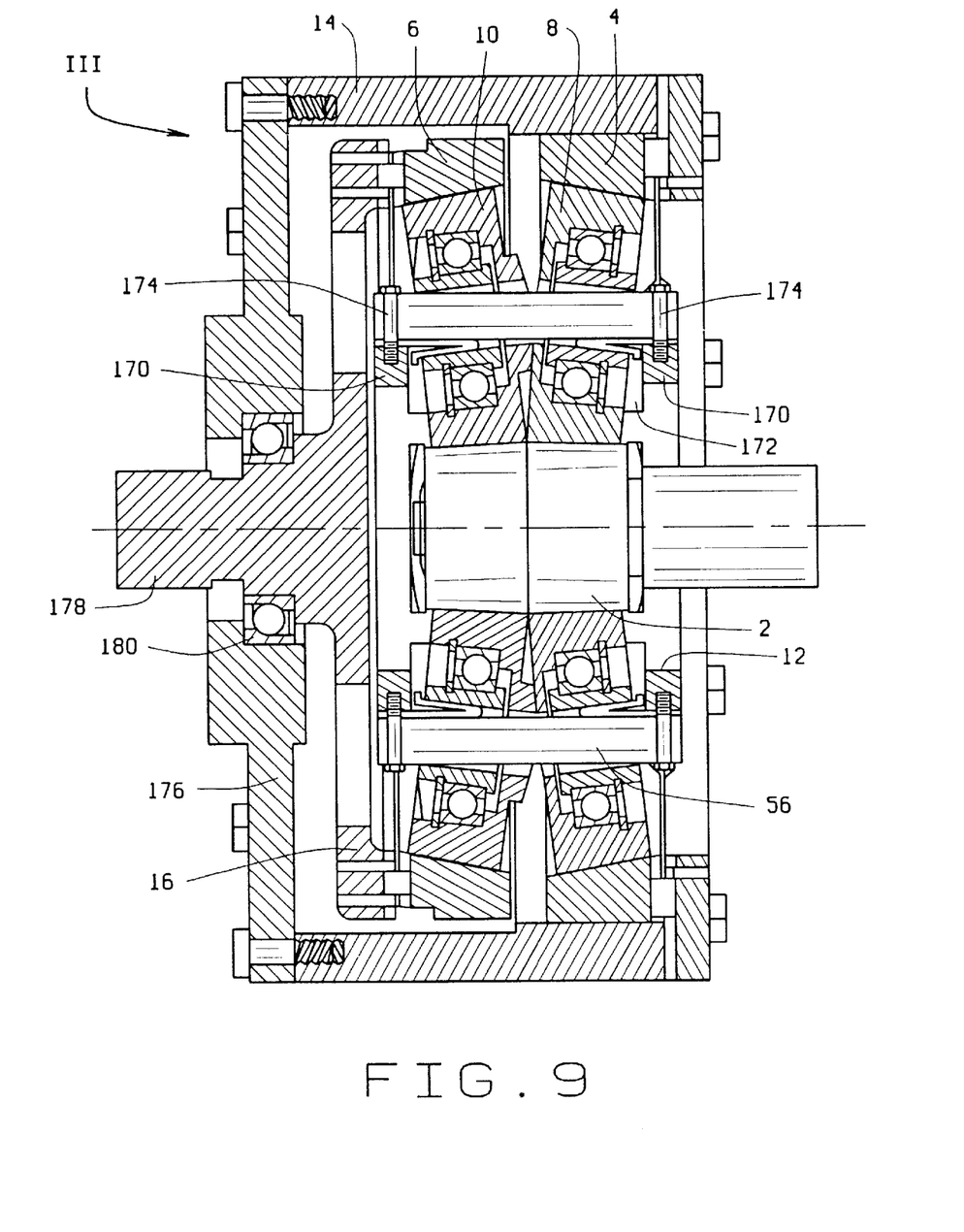
FIG. 9 is a longitudinal sectional view of still another embodiment of the transmission.

Another modified transmission III (FIG. 9) is quite similar to the transmission I and like reference numerals apply to it. However, the carrier 12 of the transmission III has similar carrier disks 170 at its ends with those disks 170 being held together by bridges 172 that pass axially through the spaces located between aligned pairs of planet rollers 8 and 10. Indeed, the disks 170 and the bridges which connect them are formed integral. The tie rods 56 are secured to the carrier disks 170 with machine screws 174 which pass through the rods 56 radially with respect to the axis X and thread into the disks 170. Moreover, the housing 14 has an end wall 176 which lies in front of the end disk 16 which rotates with the outer ring 6. The end disk 16 includes an end shaft 178 which rotates within a ball bearing 180 that are located in the end wall 176. The bearing 180 in addition to taking radial loads, carries axial loads, and thus prevents the end disk 16 from moving away from the outer ring 6.

What is claimed is:

1. A traction drive transmission which is organized about a center axis, said transmission comprising: a sun roller; first and second inner raceways mounted on the sun roller and being tapered such that their large diameter ends are presented toward each other; first and second outer raceways tapered such that their large diameter ends are presented toward each other, the first outer raceway being located around the first inner raceway and the second outer raceway being located around the second inner raceway, one of the first raceways being rotatable relative to its corresponding second raceway and the other of the first raceways being generally locked with respect to its corresponding second raceway; first planet rollers arranged in a row between the first raceways and having tapered side faces which contact the first inner and outer raceways and second planet rollers arranged in a row between the second raceways and having tapered side faces that contact the second inner and outer raceways, the first and second planet rollers being arranged in pairs, with the first planet roller of any pair backing and serving to axially position the second backing roller of the pair and vice versa; and a carrier connected to the first and second planet rollers.

2. A traction drive transmission according to claim 1 wherein pure rolling contact characterized by the absence of spinning exists between:
   a. the first inner raceway and the first rollers
   b. the first outer raceway and the first rollers
   c. the second inner raceway and the second rollers
   d. the second outer raceway and the second rollers
   e. the first and second rollers of each pair.

3. A traction drive transmission according to claim 1 wherein
   a. the first inner raceway lies in a conical envelope having its apex at a first point along the center axis;
   b. the first outer raceway lies in a conical envelope having its apex at the first point on the center axis;
   c. the second inner raceway lies in a conical envelope having its apex at a second point along the center axis; and
   d. the second outer raceway lies in a conical envelope having its apex at the second point along the center axis.

4. A traction drive transmission according to claim 3 wherein
   a. the side faces of the first rollers lie in conical envelopes having their apices at the first point along the center axis;
   b. the side faces of the second rollers lie in conical envelopes having their apices at the second point along the center axis;
   c. the first rollers revolve about first axes that intersect the center axis at the first point;
   d. the second rollers revolve about second axes that intersect the center axis at the second point;
   e. the first and second axes for the first and second rollers for any pair of first and second rollers intersect at a third point.

5. A traction drive transmission according to claim 4 wherein
   a. the envelopes of the first and second inner races intersect at a fourth point;
   b. the first and second rollers of each pair have end faces where they contact each other, and
   c. the end faces of each pair of first and second rollers contact each other along a straight line connecting the third and fourth points.

6. A traction drive transmission according to claim 4 wherein:
   a. the envelopes of the first and second outer raceways intersect at a fourth point;
   b. the first and second rollers of each pair have end faces where they contact each other, and
   c. the end faces of each pair of first and second rollers contact each other along a straight line connecting the third and fourth points.

7. A traction drive according to claim 1 wherein the second outer raceway rotates relative to the first outer raceway.

8. A traction drive transmission according to claim 7 and further comprising an outer ring which carries the second outer raceway, and an end disk connected to the outer ring and rotatable with it.

9. A traction drive transmission according to claim 1 wherein the second inner raceway rotates relative to the first inner raceway.

10. A traction drive transmission according to claim 1 and further comprising a housing; first and second outer rings located in the housing with the first outer raceway being on the first outer ring and the second outer raceway being on the second ring.

11. A traction drive according to claim 10 wherein the housing and at least one of the outer rings have opposed ramps; and further comprising rolling elements located between the ramps of the housing and said one outer ring, the ramps being oriented such that the rolling elements move up them and urge said one outer ring axially toward the other outer ring when relative rotation occurs between said one ring and the housing.

12. A planetary traction drive transmission which is organized about a center axis, said transmission comprising: a sun roller having first and second inner raceways which are tapered and arranged such that their large diameter ends are presented toward each other; a first outer ring having a first outer raceway presented toward the first inner raceway; and a second outer ring having a second outer raceway presented toward the second inner raceway; the first and second rings being detached such that relative rotation can occur between the rings, the first and second outer raceways being tapered and oriented such that their large diameter ends are presented toward each other; first planet rollers located in a row between the sun roller and the first outer ring, with each having a tapered side face and an end face, the side faces of the first roller contacting the first inner and outer raceways; second planet rollers located in a row between the sun roller and the second outer ring, with each having a tapered side face and an end face, the side faces of the second rollers contacting the second inner and second outer raceways, each second roller being located opposite one of said first rollers, so that the first and second rollers are arranged in pairs, the end face on the second roller of any pair bearing against the end face of the first roller of that pair; and a carrier coupled to the first and second rollers.

13. A traction drive transmission according to claim 12 wherein the inner raceways of the sun roller are fixed in position with respect to each other.

14. A traction drive transmission according to claim 12 wherein pure rolling contact characterized by the absence of spinning exists between:
   a. the first inner raceway and the first rollers;
   b. the first outer raceway and the first rollers;
   c. the second inner raceway and the second rollers;
   d. the second outer raceway and the second rollers;
   e. the end faces of the first and second rollers of each pair.

15. A traction drive transmission according to claim 12 wherein
   a. the first inner raceway lies in a conical envelope having its apex at a first point along the center axis;
   b. the first outer raceway lies in a conical envelope having its apex at the first point on the center axis;
   c. the second inner raceway lies in a conical envelope having its apex at a second point along the center axis; and
   d. the second outer raceway lies in a conical envelope having its apex at the second point along the center axis.

16. A traction drive transmission according to claim 15 wherein
   a. the side faces of the first rollers lie in envelopes having their apices at the first point along the center axis;
   b. the side faces of the second rollers lie in envelopes having their apices at the second point along the center axis;
   c. the first rollers revolve about first axes that intersect the center axis at the first point;
   d. the second rollers revolve about second axes that intersect the center axis at the second point;
   e. the first and second axes for the first and second rollers for any pair of first and second rollers intersect at a third point.

17. A traction drive transmission according to claim 16 wherein
   a. the envelopes of the first and second inner races intersect at a fourth point; and
   b. the end faces of each pair of first and second rollers contact each other along a straight line connecting the third and fourth points.

18. A planetary traction drive transmission that is organized about a center axis, said transmission comprising: a first sun roller having its axis along the center axis and further having a first inner raceway that is tapered and presented outwardly away from the center axis; a second sun roller having its axis along the center axis, but being detached from the first sun roller such that one of the sun rollers can rotate relative to the other sun roller, the second sun roller having a second inner raceway that is tapered and presented away from the center axis, the large diameter end of the second inner raceway being presented toward the large diameter end of the first inner raceway; a first outer ring located around the first sun roller and having a first outer raceway that is tapered and presented inwardly toward the first inner raceway; a second outer ring located around the second sun roller and having a second outer raceway that is tapered and presented inwardly toward the second inner raceway, the large diameter end of the second outer raceway being presented toward the large diameter end of the first outer raceway; first planet rollers located in a row between the first sun roller and the first outer ring, with each having a tapered side face and an end face, the side faces of the first rollers contacting the first inner and outer raceways; second planet rollers located in a row between the second sun roller and the second outer ring, with each having a tapered side face and an end face, the side faces of the second rollers contacting the second inner and second outer raceways, each second roller being located opposite a first roller so that the first and second rollers are arranged in pairs, the end face on the second roller of any pair bearing against the end face of the first roller of that pair; and a carrier coupled to the first and second rollers.

19. A traction drive transmission according to claim 18 wherein the first and second outer rings are locked such that they do not rotate relative to each other.

20. A traction drive transmission according to claim 18 wherein pure rolling contact characterized by the absence of spinning exists between:
   a. the first inner raceway and the first rollers;
   b. the first outer raceway and the first rollers;
   c. the second inner raceway and the second rollers;
   d. the second outer raceway and the second rollers; and
   e. the first and second rollers of each pair.

21. A traction drive transmission according to claim 18 wherein
   a. the first inner raceway lies in a conical envelope having its apex at a first point along the center axis;
   b. the first outer raceway lies in a conical envelope having its apex at the first point on the center axis;
   c. the second inner raceway lies in a conical envelope having its apex at a second point along the center axis; and
   d. the second outer raceway lies in a conical envelope having its apex at the second point along the center axis.

22. A traction drive transmission according to claim 21 wherein
   a. the side faces of the first rollers lie in conical envelopes having their apices at the first point along the center axis;
   b. the side faces of the second rollers lie in conical envelopes having their apices at the second point along the center axis;
   c. the first rollers revolve about first axes that intersect the center axis at the first point;
   d. the second rollers revolve about second axis that intersect the center axis at the second point; and
   e. the first and second axes for the first and second rollers of for any pair of first and second rollers intersect at a third point.

23. A traction drive transmission according to claim 22 wherein
   a. the envelopes of the first and second outer raceways intersect at a fourth point; and
   b. the end faces of each pair of first and second roller contact each other along a straight line connecting the third and fourth points.

\* \* \* \* \*